Nov. 23, 1954

D. KLIJZING ET AL 2,694,989

APPARATUS FOR THE AUTOMATIC FIRING OF SOLID FUEL SUCH
AS COKE AND SIMILAR FUELS, AND IN PARTICULAR
RELATING TO THE FIRING OF LARGE COKE

Filed Jan. 3, 1951

INVENTORS
DANIEL KLIJZING
KATRINUS IDEMA

BY Cushman, Darby & Cushman
ATTORNEYS

Nov. 23, 1954 D. KLIJZING ET AL 2,694,989
APPARATUS FOR THE AUTOMATIC FIRING OF SOLID FUEL SUCH
AS COKE AND SIMILAR FUELS, AND IN PARTICULAR
RELATING TO THE FIRING OF LARGE COKE
Filed Jan. 3, 1951 3 Sheets-Sheet 2

INVENTORS
DANIEL KLIJZING
KATRINUS IDEMA

BY *Cushman, Darby & Cushman*
ATTORNEYS

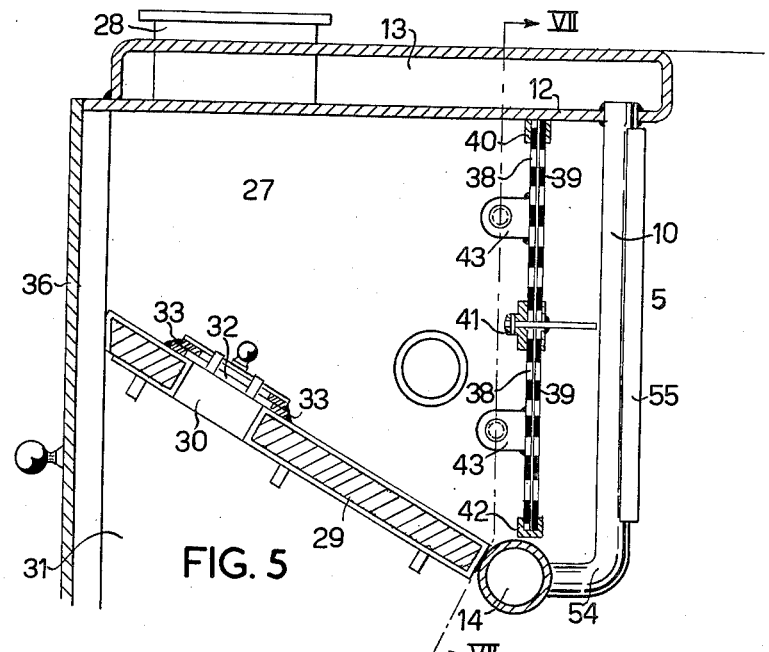
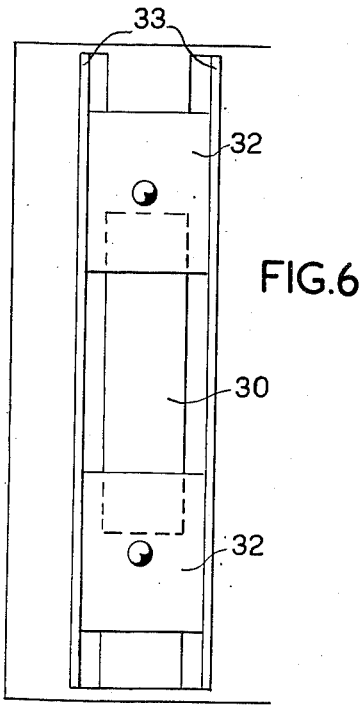
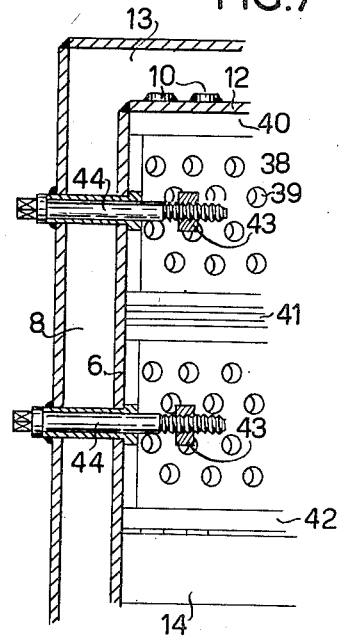

United States Patent Office 2,694,989
Patented Nov. 23, 1954

2,694,989

APPARATUS FOR THE AUTOMATIC FIRING OF SOLID FUEL SUCH AS COKE AND SIMILAR FUELS, AND IN PARTICULAR RELATING TO THE FIRING OF LARGE COKE

Daniël Klijzing, Amersfoort, and Katrinus Idema, Voorburg, Netherlands, assignors to De Directie van de Staatsmijnen in Limburg, handelend voor en namens de Staat der Nederlanden, Heerlen, Netherlands Application January 3, 1951, Serial No. 204,194

Claims priority, application Netherlands January 6, 1950

5 Claims. (Cl. 110—29)

This invention relates to an apparatus for the automatic firing of solid fuel such as coke and similar fuels, and in particular relates to the firing of large coke.

In greater detail, the invention relates to an apparatus in which the fuel is delivered into the top of a vertical combustion chamber, with the ashes and slag being discharged from the bottom of the combustion chamber.

Known furnaces of this general type operate satisfactorily as long as the size of the pieces of fuel is not too large, that is, if in general the furnace is fired with nuts from 5 to 15 mm. or with broken coke. However, when larger pieces of fuel are used, difficulties are encountered due to the tendency of the pieces of fuel to cause the fire, when burning slowly, to be more liable to be extinguished than when smaller pieces of fuel are used. This phenomenon is due to the fact that the ratio between the surface area and the volume of a piece of fuel is small when its volume is great. On account of this the total reaction surface area of fine fuel will be greater as that of the same quantity of coarser fuel, so that fine fuel will produce in a given time more heat than the same quantity of coarser fuel. If it should happen that the amount of heat produced by the fuel is smaller than the amount which is carried off by the consumer, the fire will be extinguished, and as explained, this is more likely to occur with larger than with the smaller pieces of fuel.

With lean coal the just mentioned phenomenon does not occur so rapidly as when coke is used as a fuel. Lean coal contains about 10% volatile components which, being of a very high reactivity, maintains the combustion even at lower temperatures. Owing to the presence of these volatile components, the fire will rapidly brighten after the supply of combustion air is increased, provided the grain size of the lean coal pieces is not too large. Coke, on the other hand, has lost much or most if not all of its volatile components during its manufacture, so that if larger coke is used, it is difficult to maintain or accelerate the combustion in a banked or slow fire.

Moreover, even if the fire should not be extinguished at the low temperature in a slow fire, considerable waste of fuel occurs in the slag. This is because a piece of fuel burns only at its surface, and in a slow fire a slag layer will develop and enclose the core of the piece of fuel. When this happens the core cannot participate in the combustion and is removed unburnt with the slag.

The primary object of the present invention is to provide an apparatus for the automatic firing of solid fuels.

A further object of the present invention is to provide an apparatus for the automatic firing of solid fuels in which large pieces of fuel are present.

A further object of the present invention is to provide an apparatus for the automatic firing of solid fuels in which large pieces of fuel, particularly coke, having a size of 0.8" up to 4.8", can be fired with high efficiency.

A further object of the invention is to provide an apparatus in which the fire will not be extinguished in cases in which only a low heat capacity is required.

A further object of the invention is to provide an apparatus in which a banked or slow fire may be quickly accelerated.

A further object of the invention is to provide an apparatus in which the pieces of fuel have to pass a zone of high temperature so that the slag will melt and the pieces of fuel cannot be enclosed by a layer of slag.

A further object of the invention is to provide an apparatus in which the slag is cooled in such a way that it is rendered porous, so that combustion air may reach any combustible particle enclosed in the slag.

A further object of the invention is to provide an apparatus in which the excess of combustion air employed to obtain a complete combustion of the fuel is very low.

A further object of the invention is to provide an apparatus which may be easily controlled over a wide range.

A further object of the invention is to provide an apparatus in which the grate capacity is very high.

A further object of the invention is to provide an automatic stoker that is simple in construction, dependable in operation and very suitable for the central heating of buildings and the like.

Further objects and advantages of the invention will become apparent from the following detailed description and the appended claims.

Figure 5 shows the air distribution box on a greater scale;

Figure 6 is a detail view of the bottom of the air distribution box; and

Figure 7 is a sectional view on the line VII—VII of Figure 5.

Figure 1:
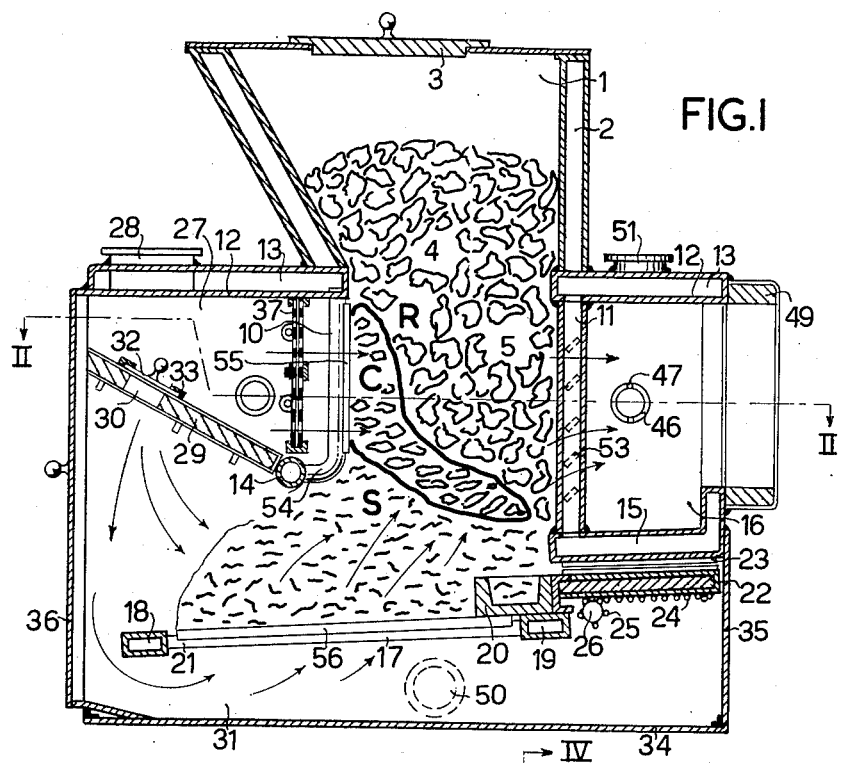
Figure 1 is a longitudinal section of a furnace installation which can be used in connection with a central heating boiler.
Figure 2:
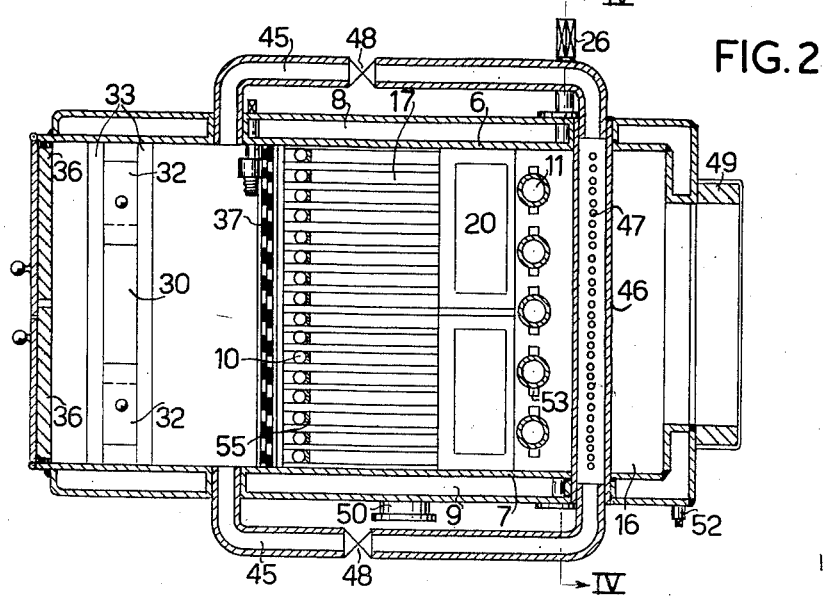
Figure 2 is a sectional view of the furnace taken on the line II—II of Figure 1.
Figure 3:
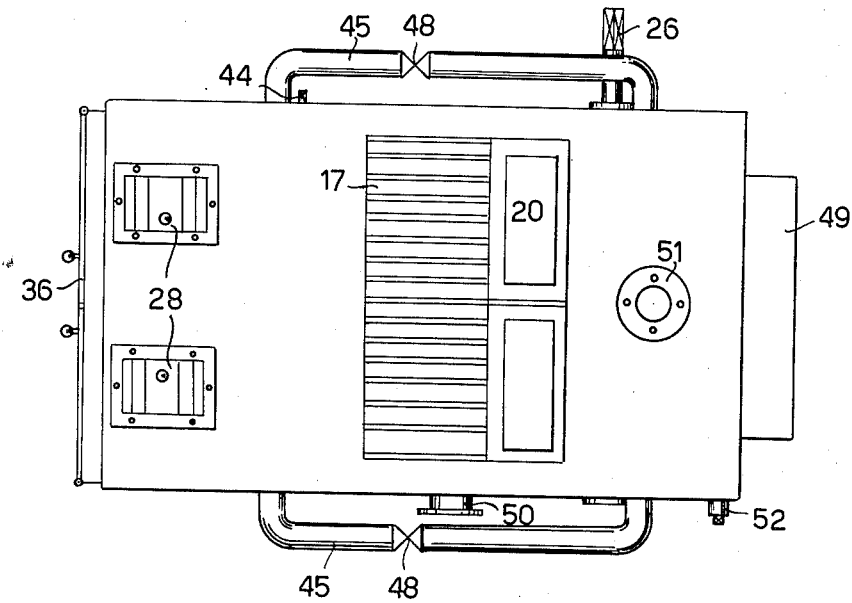
Figure 3 is a top plan view of the furnace shown in Figure 1, in which the feed bin is omitted.
Figure 4:
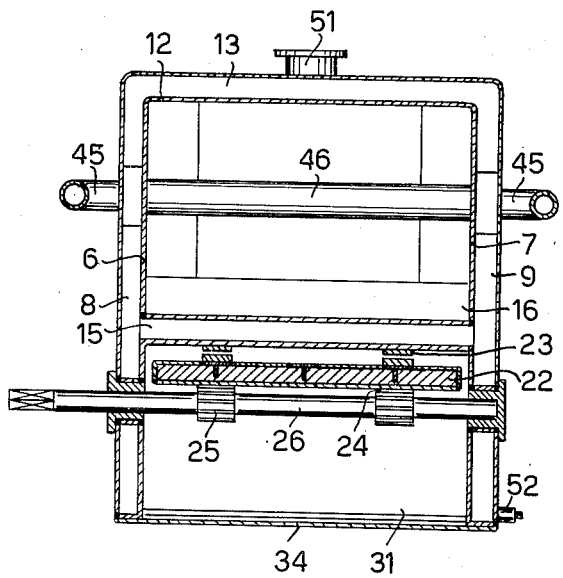
Figure 4 is a sectional view of the furnace taken on the line IV—IV of Figure 2.

Referring now primarily to Figure 1, solid fuel such as large coke is stored in a feed bin 1, which is provided with a water jacket 2 and may be closed by a coverplate 3. The bin empties through a discharge opening 4 into the top end of a combustion chamber 5, through which chamber the coke descends by gravity during operation of the furnace.

The combustion chamber is located between the side walls or panels 6 and 7 of the furnace, which side walls are provided with water jackets 8 and 9, and between a front and a rear wall or panel, which are constituted by a multiplicity of water-cooled pipes 10 and 11. These pipes open with their upper ends in the upper wall 12 of the furnace, which wall is provided with a water jacket 13, communicating with the water jackets 8 and 9 of the side walls. The pipes 10 open with their lower ends in the collecting-header 14, which also communicates with the water jackets 8 and 9. The pipes 11 open with their lower ends in a water jacket 15 constituting the bottom of the smoke-box 16 and communicating with the water jackets 8 and 9. The pipes 10 constituting the front wall of the combustion chamber are disposed with their lower ends at a higher level as the lower ends of the pipes 11 constituting the rear wall of the combustion chamber.

The bottom of the combustion chamber is formed by a slightly inclined grate 17, which is composed of a plurality of hollow water-cooled bar-like members, opening in headers 18 and 19, which headers communicate with the water jackets 8 and 9. A slag pusher 20 is provided, which may be reciprocated over the grate 17 so as to remove the slag underneath the collecting header 14 onto the front portion 21 of the grate. The slag pusher is guided with its extension 22 along the plates 23 fixed to the jacket 15, and is provided with two racks 24, cooperating with the pinions 25 fixed to the shaft 26 which shaft protrudes outside the furnace. By rotating this shaft the slag pusher may be moved over the grate.

The combustion air is introduced into an air distribution box 27 by means of a thermostatically controlled fan (not shown) connected with its outlet pipe to the inlet openings 28. From the distribution box, which adjoins the front wall of the combustion chamber, a first portion of what may be termed primary combustion air passes between the pipes 10 and travels in a substantially horizontal direction through the fuel in the combustion chamber.

The inclined bottom 29 of the distribution box is provided with an opening 30 through which air flows into the ashpit 31. The bottom of the ashpit is formed by a baseplate 34, whereas the side walls are formed by the walls 6 and 7 and the back wall 35. Doors 36 are provided to give access to the ashpit in order to remove slag and ashes from the grate 21 and the ashpit. Slide plates 32 are adapted to move in the guides 33, which are fixed to the bottom of the distribution box. In this way the size of the air passage 30 can be adjusted. Because of air passing through passage 30, a second portion of primary combustion air from the ashpit flows in a generally diagonal direction through the combustion residue and the overlying fuel disposed on the grate 17.

The ratio between the amounts of primary combustion air entering the combustion chamber through the interstices between the pipes 10 and from the ashpit 31 may be controlled by adjusting either the size of the opening 30 by means of the slide plates 32 or by means of an adjustable passage element 37, which has been disposed in the distribution box in front of the pipes 10. This passage element consists of two sets of perforated plates 38 and 39 of which the plates 38 are slidably arranged, so that the effective passage area can be altered without disturbing the uniform flow distribution of the air stream passing through the front wall of the combustion chamber by changing the position of the plates with respect to each other.

The plates are supported and guided by the members 40, 41 and 42. Nuts 43 are fixed to the plates 38 and cooperate with bolts 44 protruding outside the furnace. By rotating these bolts the plates 38 slide with respect to the plates 39, so that the openings in the plates are partly covered with the result, that the effective air passage through the plates changes.

The combustion gases leave the combustion chamber through the interstices between the pipes 11, from where they enter the smoke box 16. The conduits 45 connect the air distribution box with the smoke box. These conduits communicate with a pipe 46 disposed in the smoke box, which pipe is provided with a multiplicity of small apertures 47, through which secondary combustion air enters the smoke box. The amount of secondary air and also the ratio between the amounts of primary and secondary air may be regulated by means of the control valves 48.

The combustion gases may flow towards a boiler through a duct 49.

Cold water is introduced into the water jacket of the furnace through the inlet 50, whereas hot water leaves the jacket through the outlet 51. From here it may be sent to the infeed of the boiler or it may be used for other purposes. The water jackets may be emptied through the tap-off valve 52.

In operation the fuel descends gradually by gravity from the bunker 1 into the combustion chamber 5. The pieces of fuel are prevented from dropping between the pipes 11 and into the smoke box 16 by fins 53 welded to the pipes. To prevent fine particles from collecting in the air distribution box 27 the lower end 54 of the pipes 10 is bent forwards. If the primary air is exclusively supplied in a horizontal direction through the front wall 10, the combustion zone will be formed along this wall. Consequently the temperature in the combustion chamber and hence also the slag temperature will decrease towards the rear wall 11. As a result, pieces of fuel deposited near the rear wall will be enclosed by the slag and are wasted, while compact slag agglomerations are formed which are difficult to remove. The diagonal current of additional air causes the formation of another combustion zone on the slag bed S. Consequently, the combustion zone in the furnace according to the invention will be of the form which, in Figure 1, is designated by the reference symbol C. To protect the pipes 10 and the grate bars 17 against the fire, insulating linings 55 and 56 are provided on the side facing the combustion zone.

The term combustion zone as used in the present application refers to the zone where the fuel is completely burned. The $CO_2$ produced in this zone passes through the glowing fuel bed between the combustion zone and the rear wall. In this zone, which in Figure 1 is designated by the reference symbol R, the gases are partly reduced to CO. Subsequently the gases pass through the interstices between the pipes 11 into the smoke box 16, where they are mixed with secondary air, so that the CO is oxidized to $CO_2$.

While the fuel gravitates from the bin into the combustion chamber the volatile components present therein are expelled by the heat produced in the combustion zone. The incandescent fuel passes through the reducing zone R where it reacts with the carbon dioxide produced in the combustion zone. As a result hereof the grain size of the fuel is reduced and the particles get cracked with a larger reactive surface as a result. Subsequently the fuel proceeds through the combustion zone where it is completely burned and the slag melts. Owing to the air current fed from beneath, which ascends through the incandescent slag, the letter has little or no opportunity to agglomerate. Thus an easily removable porous slag is formed, which is periodically discharged by the slag pusher.

The extension of the grate 21 below the distribution box 27 permits the slag moving from the bottom of the combustion chamber to be cooled by the previously mentioned second portion of the primary air, and that portion of the primary air is preheated by the hot slag before entering the combustion chamber. In addition, the air permits any fuel which may be present in the slag on the extended portion of the grate to react with the combustion air.

To prevent the air fed diagonally from below grate 17 short-circuiting between the ashpit 31 and the smoke box 16, while at the same time causing the air to follow a longer trajectory through the fuel, the bottom section of the combustion chamber adjoining the rear wall is closed by disposing the header 19 in front of this wall. The closed construction of this part of the bottom may also be obtained by adapting the slag pusher 20 to partly overlap the bottom when the said slag pusher is in its entirely withdrawn position, as shown in Figure 1.

By regulating the ratio between the amounts of primary air flowing through the front wall and flowing through the bottom of the combustion chamber with the aid of the slide plates 32 or the adjustable passage element 37, the position and thickness of the combustion zone C may be influenced in such a way, that a porous slag is obtained and no fuel is enclosed by this slag.

The position and thickness of the combustion zone may be further influenced by adjusting the lower set of perforated plates 38 and 39 to a position different from that of the upper set of plates so that different quantities of combustion air are admitted through the front wall lower and in the upper parts of the combustion chamber.

The regulation of the ratio between the amounts of primary air and secondary air by means of the valves 48 enables the combustion process to be so controlled that the flue gases, which are ultimately discharged through the stack, are substantially free from combustible gases whereas the excess of combustion air to obtain this result is as small as possible.

The installation described may be used in conjunction with a water or steam boiler for central heating as well as for other purposes. The smoke box 16, where the gases are oxidized, may be constructed as a heat exchanger, but, as illustrated in the drawing, the installation may also be used as a self-contained furnace for a boiler.

As an example of the operation of the invention, in a test with coke of 1.6-2.4", a grate capacity (combustion rate per sq. m. of combustion area per hour) of $10^6$ kcal./sq. m. per hour and an efficiency of 90% were attained. The flue gases carried off through the stack were free from CO and contained 20% $CO_2$. The excess of combustion air varied from zero to 5%. The valves 48 were so adjusted that 22% of the combustion air was introduced as secondary air into the smoke box 16. The ratio between the area of the passage opening 30 and the effective passage area of the passage element 37 amounted to 0.15, whereas the effective passage area of the lower set of plates was equal to that of the upper set of plates. After the test, the fuel supply was stopped and the fan switched off. The natural draft was sufficient to keep the fire smouldering for about 60 hours. After switching on the fan it took 15 minutes to reach the full capacity of the furnace. Tests at low capacity also showed an efficiency of about 90%.

It will be understood that the foregoing detailed description and examples of operation have been made solely for purposes of illustration and are not intended to limit the invention. The true scope of the invention is to be determined from the appended claims.

What is claimed is:

1. In apparatus for the firing of solid fuel, a fuel combustion chamber comprising apertured front, rear and bottom panels, the rear panel having its lower end at a lower level than the lower edge of the front panel, said bottom panel having apertures of size sufficient to pass small particles of ash therethrough but retain combustion residues thereon, means to deliver fuel into the combustion chamber through the top of the chamber, means for introducing a first portion of combustion air into the combustion chamber through the apertured front panel, means for introducing a second portion of air into the combustion chamber diagonally upwardly through the apertured bottom panel and the space between the lower end of the front panel and the bottom panel, and a slag pushing means mounted above said bottom panel for movement thereon to discharge the combustion residues out of the combustion chamber through the space between the front panel and the bottom panel, whereby slag is cooled and the second portion of air entering through the apertured bottom panel is preheated.

2. Apparatus as in claim 1 comprising means for regulating the ratio between the amount of air passing through the upper portion of the front panel and the amount of air passing through the lower portion of the front panel.

3. Apparatus as in claim 2, comprising an air distribution box adjoining the front panel and communicating with said chamber through the apertured front and bottom panels and the space between the lower end of the front panel and the bottom panel, a combustion gas receiving chamber communicating with the combustion chamber through the apertured rear panel and communicating with said air distribution box through a conduit, and means for introducing combustion air into said distribution box.

4. Apparatus as in claim 3, including perforated plates positioned against one another close to the front panel, and means to slide said plates with respect to one another.

5. In an apparatus for firing of solid fuel, a fuel combustion chamber comprising apertured front, rear and bottom panels, the rear panel having its lower end at a lower level than the lower edge of the front panel, means to deliver fuel into the combustion chamber through the top of the chamber, means for introducing a first portion of combustion air into the combustion chamber through the apertured front panel, means for introducing a second portion of air into the combustion chamber through the apertured bottom panel and the space between the lower end of the front panel and the bottom panel, means for regulating the ratio between the amount of air passing through the upper portion of the front panel and the amount of air passing through the lower portion of the front panel, an air distribution box adjoining the front panel and communicating with said chamber through the apertured front and bottom panels and the space between the lower end of the front panel and the bottom panel, a combustion gas receiving chamber communicating with the combustion chamber through the apertured rear panel and communicating with said air distribution box through a conduit, means for introducing combustion air into said distribution box, and a slag pushing means for discharging the combustion residues out of the combustion chamber through the space between the front panel and the bottom panel, said slag pushing means in its entirely inoperative position overlapping a portion of the apertured bottom panel adjoining the lower end of the rear panel, whereby said second portion of air is prevented from short-circuiting the combustion chamber.

References Cited in the file of this patent

UNITED STATES PATENTS

| Number | Name | Date |
|---|---|---|
| 228,061 | Gregory | May 25, 1880 |
| 695,503 | Strauss | Mar. 18, 1902 |
| 1,283,668 | Cherry | Nov. 5, 1918 |
| 1,643,026 | Molby | Sept. 20, 1927 |
| 1,860,442 | Wares | May 31, 1932 |
| 2,564,713 | Miles | Aug. 21, 1951 |

FOREIGN PATENTS

| Number | Country | Date |
|---|---|---|
| 763,733 | France | Feb. 19, 1934 |
| 774,722 | France | Sept. 24, 1934 |